Figure 1:
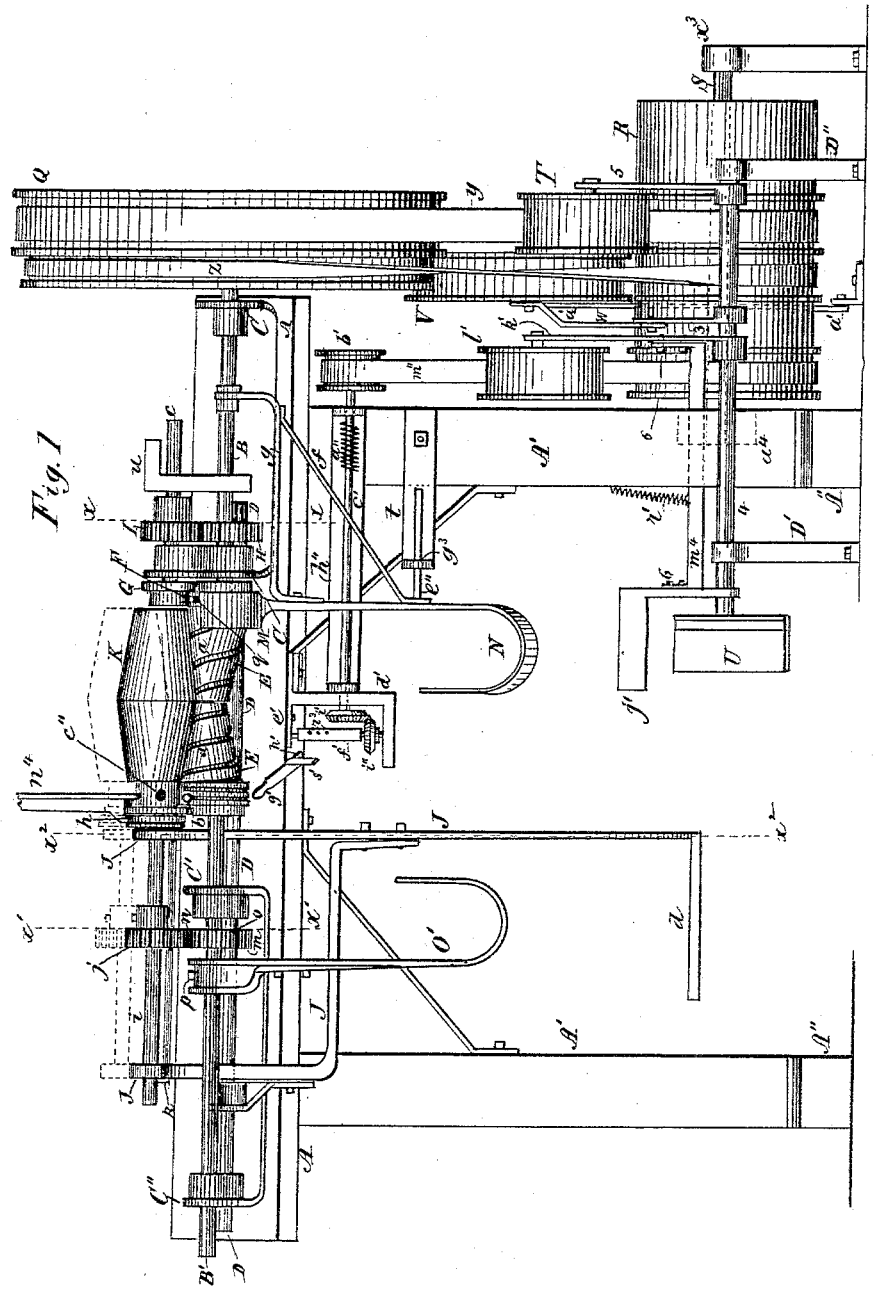

(Model.)

P. FRASER.
MACHINE FOR MAKING UPHOLSTERING SPRINGS.

No. 323,657. Patented Aug. 4, 1885.

5 Sheets—Sheet 1.

Witnesses
Chas. F. Hunt
A. T. Turnbull

Inventor.
Peter Fraser
By Wm Bruce
His Atty

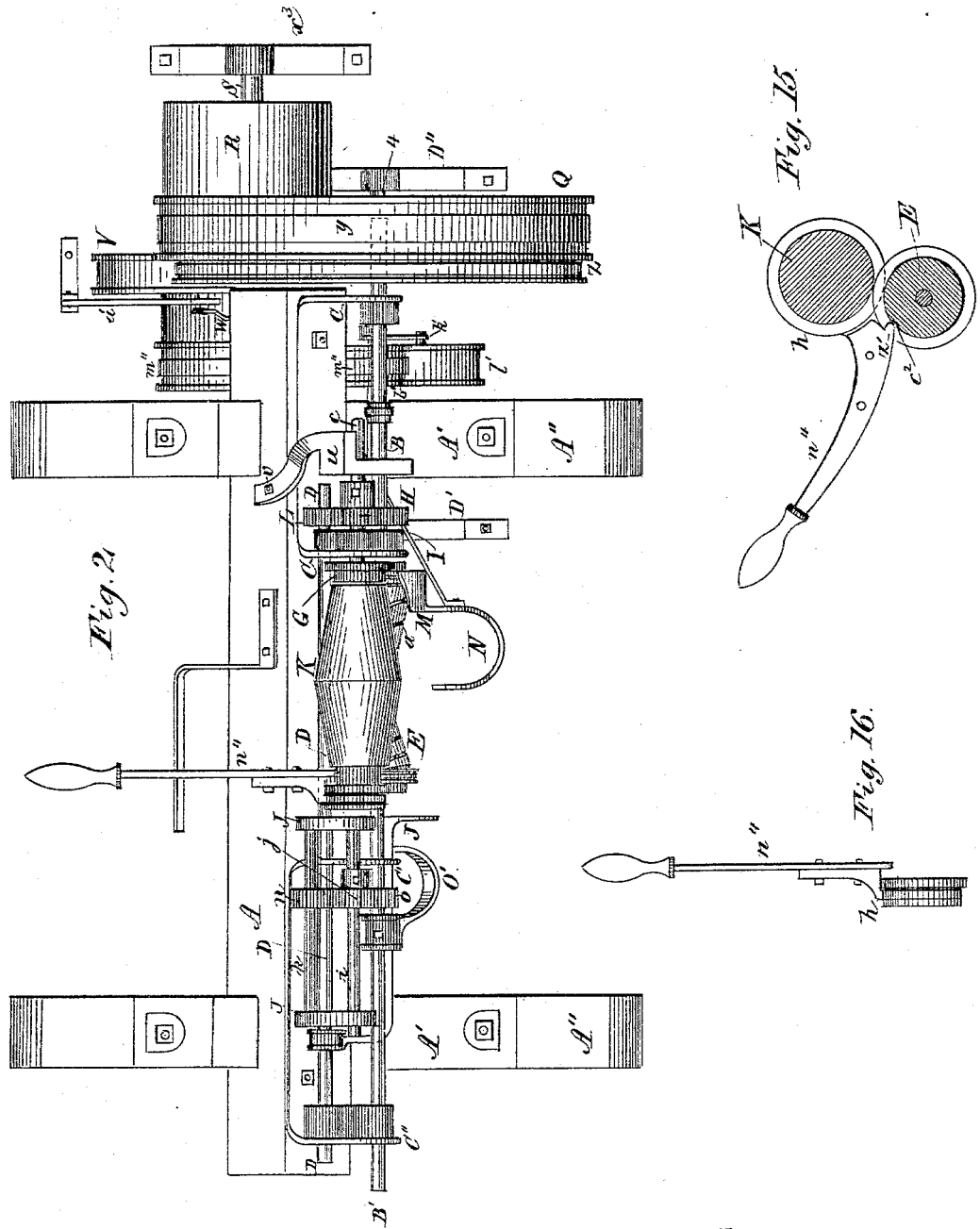

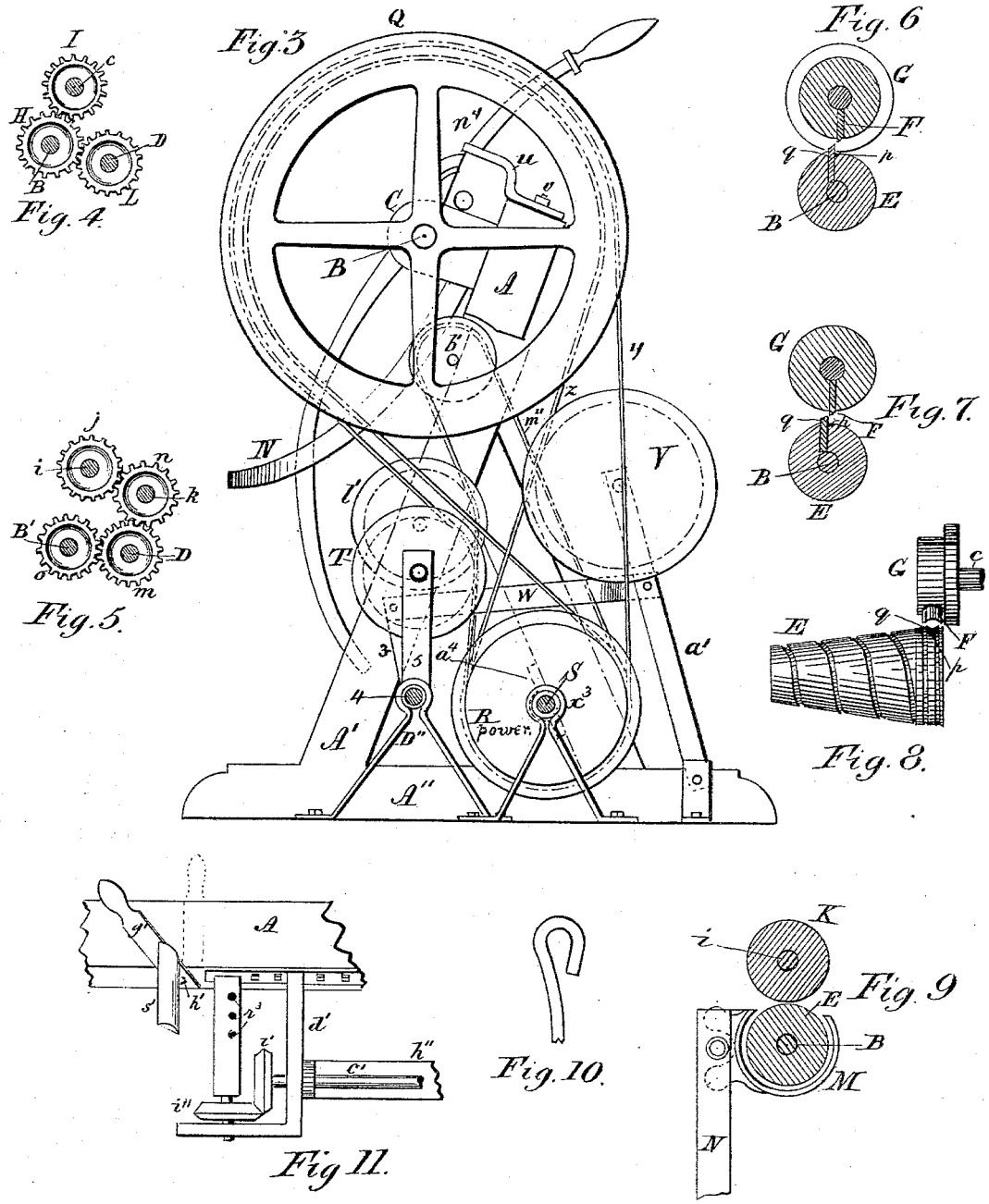

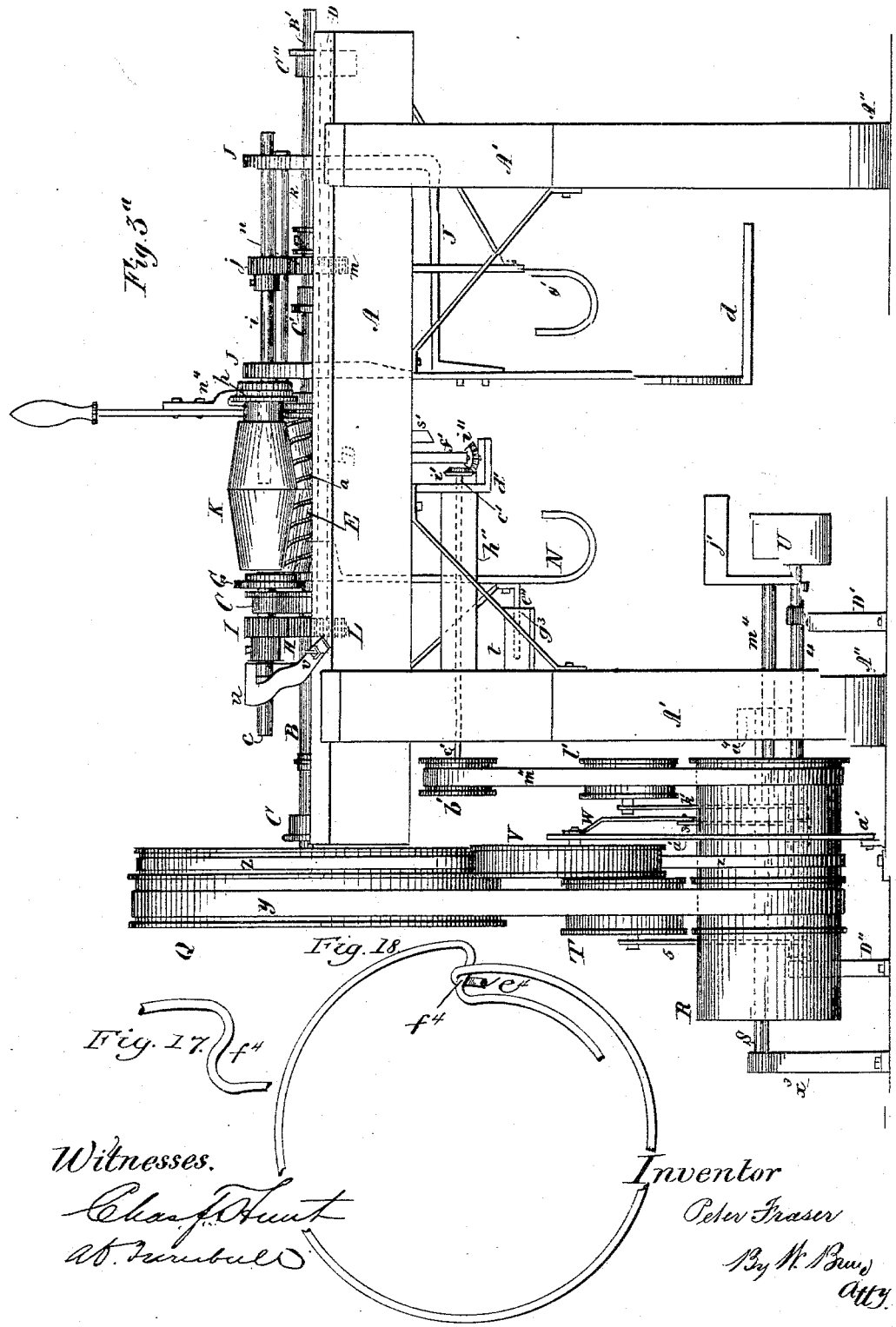

(Model.)  5 Sheets—Sheet 5.

P. FRASER.
MACHINE FOR MAKING UPHOLSTERING SPRINGS.

No. 323,657.  Patented Aug. 4, 1885.

Witnesses  Inventor
Peter Fraser
By W. Bruce
Atty

UNITED STATES PATENT OFFICE.

PETER FRASER, OF HAMILTON, ONTARIO, CANADA.

MACHINE FOR MAKING UPHOLSTERING-SPRINGS.

SPECIFICATION forming part of Letters Patent No. 323,657, dated August 4, 1885.

Application filed November 4, 1882. (Model.)

*To all whom it may concern:*

Be it known that I, PETER FRASER, of the city of Hamilton, in the county of Wentworth, in the Province of Ontario, Dominion of Canada, manufacturer, have invented certain new and useful Improvements in Machines for Making Upholstering Spiral Springs; and I do hereby declare that the following is a full, clear, and exact description of the construction and operation of the same.

The invention relates to a very simple, compact, and easily-worked machine for making different sizes of all kinds of furniture-springs, forming the same in a proper manner, and bending the end of the wires for knotting it on the end of the first spiral, and cutting the wire off automatically when the spring is completed.

The invention consists in—

First, a wooden beam to which are attached bearings to carry a series of horizontal shafts and gear-wheels, cones and pulleys, the said beam supported at each end with $\wedge$-shaped legs, the whole forming a stout frame to carry the different portions of the machine.

Second, two half cones, divided into right and left halves, are each affixed on the end of separate shafts, the two being on a line, and supported in bearings attached to the horizontal beam of the frame.

Third, a press-roller is hung in a frame and made to swing off and on the cone by a foot-lever. It is placed on the cone while each spring is being made, and raised above it when the spring is finished. The left-hand half cone and its shaft can be moved back by a knee-lever to separate the cones to remove each spring as finished. A guard is placed around the right-hand half cone to prevent the spring from flying out when the wire is cut off by the cutter.

Fourth, a double pulley is placed on the main driving-shaft, over one portion of which is a driving-belt, and over the other part is a reversing-belt, both operated from the power-pulley. Friction-pulleys are made to tighten the belts, operated by a foot-lever.

Fifth, a movable post is made to partially revolve against a hand-lever to bend the end of the wire. It is operated by bevel-gears revolved by a shaft turned by a band around a pulley on the end of it communicating with the power-pulley.

Sixth, a counter-shaft, running parallel and in rear of the pair of cone-shafts, is arranged to carry two pinions to communicate motion from one part of the machine to the other.

Seventh, a lever-handle is arranged on the press-roller to bend the wire, when necessary, into a corresponding recess in the cone.

Figure 13:
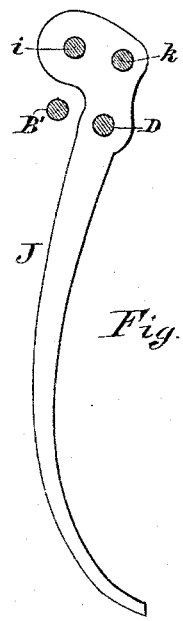
Figure 14:
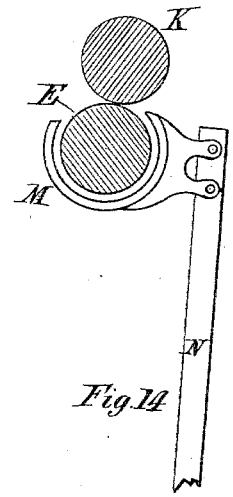
Figure 12:
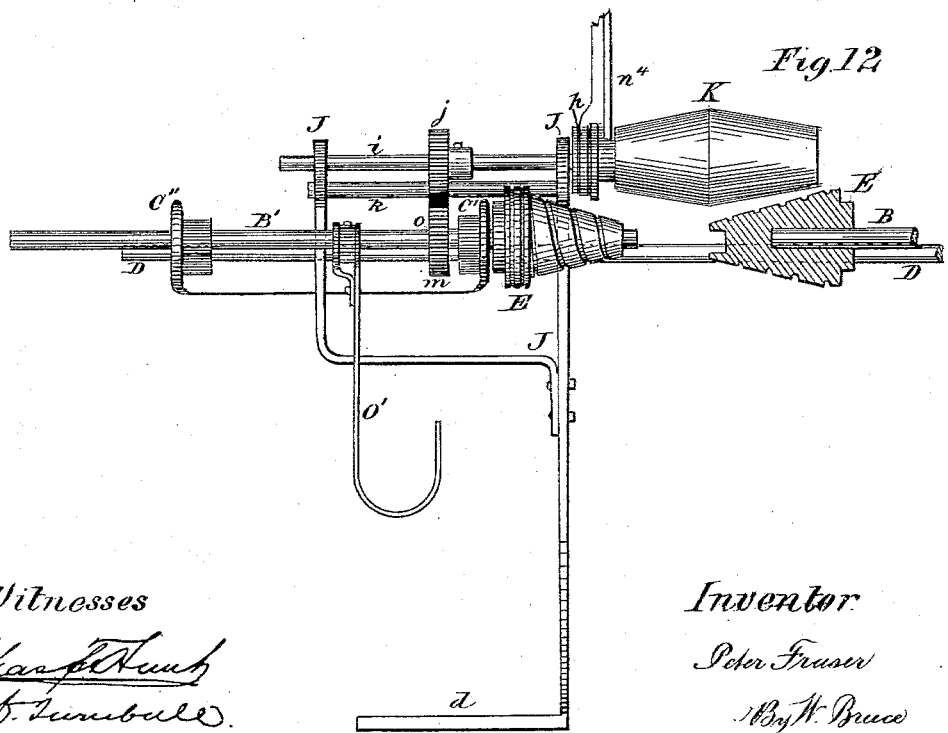

Figure 1 is a front elevation of the machine. Fig. 2 is a top or plan view. Fig. 3 is an end elevation. Fig. 3ª is a rear elevation. Fig. 4 is a side view of the three pinions on the line $x\ x$, Fig. 1. Fig. 5 is a side view of the four pinions on the line $x'\ x'$. Figs. 6 and 7 are sectional views of cutters for cutting the wire automatically after each spring is formed. Fig. 8 is a side view of the same. Fig. 9 is a detached view of cone, spring-guard, and press-roller. Fig. 10 represents the first bend on the end of a furniture-spring. Fig. 11 represents a section of machine for bending the end of the wire, as at Fig. 10. Fig. 12 is a partial view of machine, showing the two halves of the cone separated and the press-roller slightly elevated above them to facilitate the removal of each spring after being completed on the cones. Fig. 13 is a side view of the foot-lever frame J, which elevates the press-roller as in the above figure. Fig. 14 is only a side view of the spring-holder and knee-lever. Fig. 15 is a side view of the hand-lever for bending wire and section of cone and press-roller. Fig. 16 is a front view of hand-lever and collar. Fig. 17 is a view of portion of a coil-spring, showing the second bend therein, with which the free end of the spring engages. Fig. 18 is a view of portion of a coil-spring, showing the free end thereof locked or engaged with the second bend.

A, Figs. 1, 2, 3, is a wooden bar supported by the slanting upright pieces A', attached to the horizontal base-pieces A'', made of oak or any other hard wood. To this frame the working parts of the machine are attached.

B is the main driving-shaft, supported by the metal bearing-heads C C, which are bolted to the top of the bar A, and contain journals or boxes for the said shaft to revolve in. On the outer end of said shaft is affixed the main driving-pulley Q, and on the extreme inner end is attached one half of the cone E, and near the center of the shaft is a pinion, H, the use of which will be more fully shown hereinafter. On a direct line with the shaft D is a similar one, B', which is made to pass through the heads C' C'', and through the left half of the cone E, projecting a little from the end of it, in order to enter a corresponding recess in the right half of the cone when they come together, so as to form a solid former, around which is cut a spiral groove, $a$, from one end to the other, as shown at Fig. 1, in which the wire is wound to form a spring.

$b$ is a notched pin set in the outer end portion of the left half of the cone E. The notch in said pin receives the end of the bent wire to hold it during the operation of making a spring. A recess, $c''$, Fig. 1, in the collar end of the press-roller K receives the said pin $b$ on each revolution of the cone and roller to enable both to run smoothly. A short auxiliary shaft, $c$, is made to pass through a bearing-bar, $u$, which is bolted to the frame A at the point $v$, Fig. $3^a$, the shaft B also passing through it. On the left end of said shaft $c$ is affixed a collar, G, into which is inserted one half of a steel-wire cutter, F, and in the right-hand half of cone E is inserted the other half, $q$, of the steel-cutter, each being affixed in holes drilled correspondingly in the said collar and cone, and the two parts of the cutter F $q$ project a little from the surface of each, and are formed on their edge in the shape of a half-round, as seen in Fig. 8. A small recess, $p$, is made in the cone on one side of the half-cutter $q$, (shown at Figs. 6, 7, and 8,) so as to allow the upper half, F, of the cutter to press down into it and cut the wire off when the spring is finished. As the cone E revolves on the shafts B and B' the collar G, containing the upper half, F, of the cutter, also revolves by means of a pinion, H, on the shaft B meshing into a similar pinion, I, on the shaft $c$, to which the said collar G with upper half, F, of cutter is attached. The upper and lower halves, F $q$, of the cutter thus revolve simultaneously, and are arranged to meet one another, as in Figs. 6 and 7, so as to cut off the wire as each spring is completed on the cone E.

A bulged metal press-roller, K, is made to revolve with and press on the cone E to hold the wire into the grooves in said cone in the operation of making a spring. It is secured on the end of a short shaft, $i$, the two ends of said shaft being supported in a frame, J, which is hung and swings on a counter-shaft, D, running behind and parallel with the cone-shafts B and B'. The lower end of said frame J terminates at right angles in a foot-lever, $d$, by which the operator swings the said roller on and off the cone E, as desired. The said roller K receives its motion from the counter-shaft D by means of a pinion, $m$, on said counter-shaft meshing into an intermediate loose pinion, $n$, affixed on a short auxiliary shaft, $k$, thence to a pinion, $j$, on the said roller-shaft $i$, which causes the said shaft and roller to revolve. At the same time the left-hand cone-shaft B' receives its motion also from the counter-shaft D by the pinion $m$ on the latter engaging with a pinion, $o$, on the said shaft B', the counter-shaft getting its motion from the main driving-shaft B by means of a pinion, H, on said shaft engaging with the pinion L on the right end of the counter-shaft D, the said counter-shaft being supported by the bearing-heads C C' C'' bolted to the cross-beam A. It will be observed that the roller K will always revolve on the cone E while a spring is being formed; but the operator will raise it above the cone by drawing the foot-lever $d$ of the swing-frame J toward him, as shown at Fig. 12, and will then push back the left half of the cone and its sliding shaft B', with the knee-lever O' attached to said shaft, to enable him to conveniently remove the spring from the cone when completed and cut.

The small device attached to the machine for bending the end of the wire, as at Fig. 16, may be described as follows: $d'$ is an ⌐-shaped bracket secured to the under side of the beam A. Between the horizontal parts of said bracket is pivoted a vertical movable post, $f'$, nearly square, at the bottom of which is a bevel-gear, $i''$, which is made to engage with a similar one, $i'$, fastened on the end of a horizontal spindle, $c'$, which revolves in bearings on a bracket, $h''$, secured to the right frame A' and the bracket $d'$. The said post is provided with small holes $r^3$, of different sizes, to correspond to the various sizes of wire, (used for springs,) which is inserted in one of the said holes preparatory to bending it. A small hand-lever, $g'$, is employed to act in conjunction with the said post $f'$. It is pivoted to the under side of the beam A by a bolt, $h'$, and provided with a pendent projection, $s'$, rounded on the side next the post $f'$. (See Figs. 1 and 11.) It is moved back and forth by the operator's hand. In bending the end of a piece of wire it is inserted in one of the holes $r^3$. The post is partially revolved one-half turn, bending the wire in its movement. The operator then grasps the lever-handle $g'$ and presses its aforesaid rounded projection $s'$ against the partially bent wire, and completes the bending of it, as shown at Fig. 10.

The power to turn the post $f'$ is received from the pulley $b'$, secured on the right end of the shaft or spindle $c'$, through the intermediate bevel-gear pinions $i'$ and $i''$, and the said pulley $b'$ is revolved by means of a belt, $m''$, passing over it to the power-pulley R. The movement of the said post $f'$ is regulated by means of the friction-pulley $l'$, which can be made at pleasure to tighten the said belt $m''$ or release it, as desired. The pulley $l'$ is sustained by a standard, $k'$, on the shaft 4, which latter is supported by bearings D' D'', and the said friction-pulley is pushed against the said belt $m''$ by pressure of the operator's toe downward on the upper part of the foot-lever $j'$, which is attached to the shaft 4, and by a bracket-rod, $m^4$, to the standard $k'$, which carries the said friction-pulley $l'$. A spiral spring, $r'$, has its lower end fastened to the said bracket-rod $m^4$, and its upper end secured to the frame-leg A', (see Fig. 1,) and is for the purpose of pulling the toe-lever $j'$ back again after the pressure of the operator's toe leaves it, and releases the said friction-pulley $l'$ from the belt $m'''$, which then runs loose over its respective pulleys $b'$ and R until again tightened by the friction-pulley $l'$, when required.

$a''$ is a spiral spring surrounding the spindle $c'$ for the purpose of reversing the movement of the shaft $c'$ back again to its former position when the power is off the pulley $b'$, after the bending of the wire is completed by the post $f'$, which latter returns to its former position ready to operate again.

Q is the large double driving-pulley on the end of the shaft B, over which run two belts, $y$ and $z$, to the long power-pulley R, which is placed on the shaft S and has its outer bearing on the $\bigwedge$-shaped standard $x^3$, and the inner end in a journal-box, $a^4$, attached to the inner side of the rear upright portion of the frame A', as shown by dotted lines at Fig. 1.

$y$ is the belt used for driving the machine direct, especially the cone for making the spring, and $z$ is the one used for reversing the same to remove the completed spring; and similar means, heretofore explained, are used for tightening the said direct and reversing belts by the operator's foot, which may be explained as follows:

5 is a standard secured at its lower end to the shaft 4, and at its upper end carrying a spindle on which revolves the friction-wheel T. The said shaft is supported in bearings D' D'', bolted to the floor, and the inner end of the shaft has a flat foot-lever, U, attached to it. Pressure of the operator's toe on the upper portion of this lever causes the said friction-wheel T to tighten on the belt $y$ for direct driving. The same movement releases another friction-wheel, V, on the other side from the reversing-belt $z$, as the latter belt should be loose when the former belt is tight. The said friction-wheel V is affixed to a pivoted standard, $a'$, which is bolted to the floor, and is connected to the shaft 4 by means of a connecting-rod, W, passing from the said standard $a'$ to a smaller upright standard, 3, secured to the aforesaid shaft 4. Pressure of the operator's heel on the lower part of the foot-lever U consequently draws the friction-wheel V tight on the reversing-belt $z$, and the same movement draws the front friction-pulley, T, off its belt $y$. This direct and reverse motion of the cone by the means just explained is necessary in making springs. The direct motion is put on the machine in forming the spring until completed; then the cone is reversed in removing the completed spring.

It may be observed here that when the wire is cut by the cutters F $q$, when each spring is finished it would recoil very forcibly. To provide against this I construct a circular-shaped metal spring-holder, M, to partially surround the right end of the cone E under the cutter, and held there by means of a bracket, $g$, attached thereto, its outer end being bent at right angles upward, terminating in an eye or collar surrounding and sliding on the shaft B, a brace, $f$, being affixed thereto at one end, and the other to a hooked knee-lever, N, fastened to the rear part of the said holder M, and hooked at the bottom for convenience to move the said spring-holder back and forth by the knee of the operator, as desired. The said knee-lever N of the holder M is steadied in a vertical position by means of a rod, $e''$, attached to the brace $f$, and made to slide through a guide-hole, $g^3$, in the projecting end of a small horizontal bracket, $t$, bolted to the frame A', as shown at Fig. 1. The holder M is thus held in position, but capable of being moved horizontally, if so required, by the operator in the act of removing the spring from the cone.

A power-belt is made to connect with the pulley R on the machine, which was not thought necessary to show.

The operation of the machine is as follows: The end of a coil of wire from a reel near the front of the machine is first inserted in one of the holes $r^3$ of the movable post $f'$, which is turned by the shaft $c'$ and bevel-gears $i'$ $i''$, motion being transmitted from the power-pulley R by belt $m''$ to the pulley $b'$ on said shaft $c'$. When the post is at half-turn, the lever $g'$ is pressed against the wire, which completes the bend. The flat side of the bent end is then inserted in a notch of the pin $b$ in the left end of the cone. Motion is then transmitted to the cone from power-pulley R through belt $y$ and pulley Q to the shaft B; thence through pinions H L to the counter-shaft D; thence to the shaft B' by means of the pinions $m$ and $o$, and to the press-roller shaft $i$ by means of the pinion $j$ and intermediate pinion, $n$. The cutter F in collar G receives rotary motion from the shaft B through its pinion H and pinion I on shaft $c$. Each spring, if necessary, may also be bent by the point of the lever $n^4$ pressing the wire by its rounded point into the recess $c^2$ of the cone. The cone is reversed to remove spring by pressure of the operator's heel on the lower part of the foot-lever U.

The second bend, $f^4$, of the wire of the top coil in the formation of a spring for locking thereto the extreme bent end $e^4$ is produced by a projection on the roller K bending the wire in a corresponding recess, $c^2$, in the cone E on the line of the grooves $a$. This bends the wire nearly as in Fig. 17, Sheet 6, but on account of the elasticity of the wire will not retain that position; and in order to cause it to remain so, the handle-lever $n^4$ is brought forward (it is always thrown back over the press-roller when not in use) and its rounded point $z'$ made to forcibly press the wire farther into the said recess, which effectually causes the wire to retain its bend without springing back again, in order for the end bend, $e^4$, to be caught in it and fastened thereto, as in Fig. 18. Thus the top end of the spring is held down to prevent it from springing up and tearing the mattress or other covering of the springs.

What I claim as my invention is—

1. In a machine for making upholstering-springs, the combination of the frame A A' A'', shafts B B', right and left cone-halves E, counter-shaft D, pinion L on right end of counter-shaft, pinion $m$ on left end of counter-shaft, and pinion $o$ on shaft B' for revolving the cones, all arranged and constructed substantially as and for the purpose specified.

2. In a machine for making upholstering-springs, the upper half, F, of a cutter inserted in the collar G, and the lower half, $q$, inserted in the right half of the cone E, and means for rotating the collar and cone for cutting off the wire automatically after each spring is formed, substantially as specified.

3. In a machine for making upholstering-springs, the devices for operating cutters F $q$, viz: the combination of the shaft B, pinions H I, cone E, shaft $c$, and collar G, constructed and arranged substantially as specified.

4. In a machine for making upholstering-springs, a press-roller, K, on the end of shaft $i$, and made to revolve on and with the cone E, the same being hung on a swing-frame, J, terminating in a foot-lever, $d$, at the bottom, by which the roller can be pressed on the cone while a spring is being formed around the cone, and elevated above it after it is finished and cut to facilitate its removal, substantially as specified.

5. In a machine for making upholstering-springs, the devices for revolving the press-roller K, consisting of the combination of the shaft B, its pinion H, counter-shaft D, its pinions L $m$, shaft $i$, its pinion $j$, intermediate pinion, $n$, and its shaft $k$, all constructed and arranged to carry motion from the main shaft B to the press-roller K, substantially as specified.

6. In a machine for making upholstering-springs, the combination of the sliding shaft B', bearings C' C'', left half of cone E, and knee-lever O', attached to said shaft for withdrawing left half of cone E from its right half to remove the finished springs, as specified.

7. In a machine for making upholstering-springs, the device for bending the wire, consisting of the shaft $c'$, spring $a''$, brackets $h'' d'$, bevel-gears $i' i''$, movable post $f'$, and lever $g'$, substantially as specified.

8. In a machine for making upholstering-springs, the combination, with the post $f'$, bevel-gears $i' i''$, spindle $c'$, and pulley $b'$, of the power pulley R, belt $m'''$, passing over pulleys $b'$ and R, the friction-pulley $l'$, bearing against belt $m'''$, standard $k'$, bracket $m^4$, toe-lever $j'$, shaft 4, and spring $r$, all constructed and operating substantially as described.

9. In a machine for making upholstering-springs, the combination, with the cone E, shafts B B', counter-shaft D, and pinions H L I $m$ $o$, of the devices for tightening the belt $y$, consisting of the foot-lever U, shaft 4, friction-pulley T, and standard 5, all constructed and made to operate substantially as and for the purpose specified.

10. In a machine for making furniture-springs, the devices for still further bending the wire, consisting of the combination of the lever $n^4$ on the loose collar $h$ around the shoulder of the roller K, and provided with a rounding-point, $z'$, and a recess, $c^2$, formed in the cone E for the said lever-point $z'$ to operate in to bend the wire, substantially as specified.

11. In a machine for making upholstering-springs, the combination, with the cone E, shafts B B', counter-shaft D, and their driving-pinions, of the devices for tightening the reversing-belt $z$, consisting of the combination of the friction-pulley V, standards $a'$ 3, connecting-rod W, shaft 4, bearings D' D'', and foot-lever U, all constructed and operating substantially as and for the purpose specified.

12. In a machine for making furniture-springs, a movable spring-holder, M, to partially surround the right end of cone E, and provided with a knee-lever, N, and a bracket, $g$, made to slide loose on the shaft B, by which means the said spring-holder may be shifted horizontally, as specified.

13. The combination, in a machine for making upholstering-springs, of the knee-lever N, rod $e''$, brackets $t$ $g$, spring-holder M, and shaft B, constructed and arranged substantially as and for the purpose specified.

Hamilton, Canada, October 2, 1882.

PETER FRASER.

In presence of—
CHAS. F. HUNT,
WM. BRUCE.